United States Patent [19]

Dressler

[11] 4,271,285

[45] Jun. 2, 1981

[54] ARYL SULFIDE/SULFONATE POLYMER

[75] Inventor: Hans Dressler, Pittsburgh, Pa.

[73] Assignee: Koppers Company, Inc., Pittsburgh, Pa.

[21] Appl. No.: 98,920

[22] Filed: Nov. 30, 1979

[51] Int. Cl.³ .................................. C08G 75/24
[52] U.S. Cl. ................................. 528/175; 528/391
[58] Field of Search ......................... 528/175, 391

[56] References Cited

U.S. PATENT DOCUMENTS

| | | | |
|---|---|---|---|
| 3,262,914 | 7/1966 | Goldberg et al. | 528/175 |
| 3,274,290 | 9/1966 | Goldberg et al. | 528/175 |
| 3,658,757 | 4/1972 | Conix et al. | 528/175 |
| 4,039,511 | 8/1977 | Wulff et al. | 528/175 |
| 4,094,867 | 6/1978 | Jones | 528/175 |

*Primary Examiner*—Lester L. Lee
*Attorney, Agent, or Firm*—Donald M. MacKay; Oscar B. Brumback; Herbert J. Zeh

[57] ABSTRACT

A linear aryl sulfide/sulfonate polymer having improved thermal stability is provided consisting essentially of units of the formula:

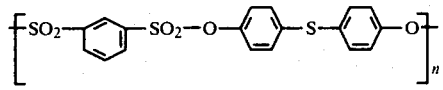

wherein n is an integer of from 3 to about 250.

1 Claim, No Drawings

ARYL SULFIDE/SULFONATE POLYMER

BACKGROUND OF THE INVENTION

Polysulfonate copolymers and particularly linear condensation copolymers containing aromatic and mixed aryl sulfonate linkages in the linear chain are disclosed in U.S. Pat. No. 3,236,808 to Goldberg et al. Those compositions comprise aromatic polysulfonate copolymers containing structural units derived from a diphenol and two or more aromatic disulfonyl halides.

DESCRIPTION OF THE INVENTION

It has now been discovered that an unusually high thermally stable polymer can be prepared from a single aromatic disulfonyl halide and a single diphenol. More particularly, the novel polymer is prepared from m-benzenedisulfonyl chloride and thiodiphenol, and consists essentially of units of the formula:

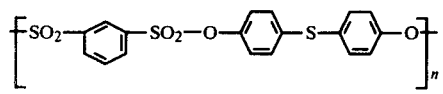

wherein n is an integer of from 3 to about 250.

The polymer of the invention can be prepared by conventional condensation procedures such as interfacial and solution polymerization techniques. If the former method is employed, relatively pure reactants must be used. Polymerization can be carried out at or near room temperature by mixing a basic aqueous solution of the sodium salt of the diphenol with the disulfonyl chloride dissolved in an inert organic solvent. A basic organic catalyst is generally employed such as a quaternary ammonium salt or amine. The reaction mixture is preferably stirred vigorously for a suitable time and the polymer precipitated or coagulated such as by addition to a non-solvent such as methanol. The precipitated polymer is generally washed to remove any residual impurities and dried.

Organic solvents utilized for the disulfonyl chloride are inert and are preferably solvents for the polymer formed. Typical solvents include benzene, sulfolane, toluene, and methylene chloride.

Polymerization times will depend on the molecular weight desired and will generally range between 0.5 and 10 hours for the polymer of the invention. In preparing the polymer, equimolar quantities of the reactants are employed although an excess of either reactant will not hinder polymerization. The amount of catalyst added may vary from about 0.01% to more than 1%. The polymerization temperature can be varied from less than 0° C. to more than 100° C. Preferably the reaction is conducted at or about room temperature, i.e. 25°–30° C.

EXAMPLE 1

To a 2 liter resin kettle equipped with a turbine agitator, circular baffle, thermometer, and addition funnel was charged 43.7 grams (0.2 mole) of thiodiphenol dissolved in 500 ml of distilled water containing 16.2 grams (0.4 mole) of sodium hydroxide and 0.5 gram of benzyltrimethylammonium chloride. With high speed agitation there was added dropwise a solution of 55.0 grams (0.2 mole) of m-benzenedisulfonyl chloride in 500 ml of methylene chloride. The addition took 30 minutes. During the addition the pot temperature rose from 32° C. to 37° C. A slurry formed almost immediately, changing from a cream color to white. The mixture was agitated at ambient temperature (25° C.) for another 2 hours to give a thick slurry. The product was then filtered through a fritted glass filter, reslurried 5 times in 500 ml of distilled water, filtered and dried for 6 hours at 60° C. in an oven at reduced pressure to give 76 grams (89% yield) of a polymer having an intrinsic viscosity of 0.262.

EXAMPLE 2 (Comparison)

In accordance with the general procedure of Example 1, a 2 liter resin kettle was charged with 45.7 grams (0.2 mole) of Bisphenol A dissolved in 500 ml of distilled water containing 16.2 grams (0.4 mole) of sodium hydroxide and 2 grams of benzyltriethylammonium chloride. With high speed agitation there was added dropwise a solution of 55 grams (0.2 mole) of m-benzenedisulfonyl chloride in 250 ml of methylene chloride. After an additional two hours of agitation, the product was filtered, washed and dried to give 83 grams (97% yield) of polymer having an intrinsic viscosity of 0.323.

EXAMPLES 3 & 4

The two polymers of Examples 1 & 2 were tested for thermal stability by heating the polymers at a heating rate of 20° C. per minute from 100° C. to 500° C. The weight loss as determined by thermogravimetric analysis both under nitrogen and air is given in the following table.

TABLE

| Temperature, °C. | Wt. % loss under N₂ | | Wt. % loss under air | |
|---|---|---|---|---|
| | Ex. 1 | Ex. 2 | Ex. 1 | Ex. 2 |
| 350 | 5.0 | 5.0 | 5.5 | 4.0 |
| 400 | 26.0 | 45.0 | 25.0 | 39.0 |
| 450 | 36.0 | 54.5 | 34.0 | 49.0 |
| 500 | 41.0 | 57.0 | 39.0 | 52.0 |

From the data, it can be seen that the polymer of Example 1 shows significantly lower weight loss in the 400°–500° C. range than the comparison polymer of Example 2.

What is claimed is:

1. A linear aryl sulfide/sulfonate polymer having improved thermal stability consisting essentially of units of the formula:

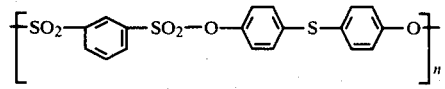

wherein n is an integer of from 3 to about 250.

* * * * *